(12) United States Patent
Kim et al.

(10) Patent No.: US 12,065,161 B2
(45) Date of Patent: Aug. 20, 2024

(54) METHOD AND APPARATUS FOR AUTOMATICALLY ARRANGING SEATS OF AUTONOMOUS VEHICLE

(71) Applicants: Hyundai Motor Company, Seoul (KR); Kia Motors Corporation, Seoul (KR); ITOPSAUTOMOTIVE CO, LTD., Gyeonggi-do (KR)

(72) Inventors: Eun Sue Kim, Gyeonggi-do (KR); Seung Hyeok Chang, Gyeonggi-do (KR); Dae Ig Jung, Gyeonggi-do (KR); Hong Heui Lee, Gyeonggi-do (KR); Han Dong Yuk, Gyeonggi-do (KR); Sang Chul Jung, Gyeonggi-do (KR); Dong Kyu Lee, Gyeonggi-do (KR); Han Jin Kim, Gangwon-do (KR); Sun Ho Hur, Seoul (KR)

(73) Assignees: Hyundai Motor Company, Seoul (KR); Kia Motors Corporation, Seoul (KR); ITOPSAUTOMOTIVE CO., LTD., Gyeonggi-do (KR)

( * ) Notice: Subject to any disclaimer, the term of this patent is extended or adjusted under 35 U.S.C. 154(b) by 307 days.

(21) Appl. No.: 17/034,105

(22) Filed: Sep. 28, 2020

(65) Prior Publication Data
US 2021/0309247 A1  Oct. 7, 2021

(30) Foreign Application Priority Data

Apr. 1, 2020 (KR) .......................... 10-2020-0039900

(51) Int. Cl.
*B60W 60/00* (2020.01)
*B60K 35/00* (2024.01)
(Continued)

(52) U.S. Cl.
CPC ............. *B60W 60/00* (2020.02); *B60K 35/00* (2013.01); *B60N 2/12* (2013.01); *B60N 2/14* (2013.01);
(Continued)

(58) Field of Classification Search
CPC ....... B60W 60/00; B60W 50/08; B60K 35/00; B60K 2370/143; B60K 2370/152;
(Continued)

(56) References Cited

U.S. PATENT DOCUMENTS 9,919,621 B2  3/2018  Lippman et al.
10,214,118 B1  2/2019  Jain et al.
(Continued)

FOREIGN PATENT DOCUMENTS

KR  20190031699 A  3/2019

*Primary Examiner* — James J Lee
*Assistant Examiner* — Alexander George Matta
(74) *Attorney, Agent, or Firm* — Fox Rothschild LLP (57) ABSTRACT

A method and apparatus for automatically arranging seats of an autonomous vehicle enable seats to be remotely changed between a standard arrangement mode and a final target arrangement mode. The apparatus includes a manipulation device configured to generate a signal corresponding to a target arrangement mode of seats through manipulation by a passenger, seat motors respectively provided in the seats so as to control positions and postures of the seats, seat controllers for controlling operation of the seat motors, and a vehicle controller configured to transmit a signal from the manipulation device to the seat controllers, transmit an abnormal signal indicating jamming of the seats to the manipulation device or control the seat controllers provided in the vehicle. As a result, it is possible to easily change the seats to a desired arrangement mode in an autonomous vehicle without interference with peripheral components during movement of the seats.

10 Claims, 4 Drawing Sheets

(51) Int. Cl.
*B60K 35/10* (2024.01)
*B60K 35/22* (2024.01)
*B60N 2/12* (2006.01)
*B60N 2/14* (2006.01)
*B60N 2/16* (2006.01)
*B60N 2/75* (2018.01)
*B60W 50/08* (2020.01)

(52) U.S. Cl.
CPC .......... *B60N 2/1635* (2013.01); *B60N 2/763* (2018.02); *B60W 50/08* (2013.01); *B60K 35/10* (2024.01); *B60K 35/22* (2024.01); *B60K 2360/143* (2024.01)

(58) Field of Classification Search
CPC ...... B60K 2370/111; B60K 2370/1438; B60K 2370/171; B60K 2370/583; B60K 37/06; B60N 2/12; B60N 2/14; B60N 2/1635; B60N 2/763; B60N 2/0244; B60N 2/06; B60N 2/01; B60N 2/0224; B60N 2/0232; B60N 2/0296; B60N 2002/0204; B60N 2/002

See application file for complete search history.

(56) References Cited

U.S. PATENT DOCUMENTS

| | | | |
|---|---|---|---|
| 2009/0224879 A1* | 9/2009 | Nakazawa | G07C 9/00309 340/5.72 |
| 2011/0282495 A1* | 11/2011 | Fischer | H04L 67/104 709/204 |
| 2016/0332538 A1* | 11/2016 | Rocha | B60N 2/0252 |
| 2017/0158087 A1* | 6/2017 | Kwon | B60N 2/0244 |
| 2017/0368964 A1* | 12/2017 | Kim | B60N 2/06 |
| 2018/0029502 A1* | 2/2018 | Georgiev | G06F 3/0362 |
| 2018/0154799 A1* | 6/2018 | Lota | B60N 2/06 |
| 2018/0304779 A1* | 10/2018 | Fitzpatrick | B62D 31/003 |
| 2019/0118676 A1* | 4/2019 | Koh | B60N 2/0244 |

* cited by examiner

METHOD AND APPARATUS FOR AUTOMATICALLY ARRANGING SEATS OF AUTONOMOUS VEHICLE

CROSS-REFERENCE TO RELATED APPLICATION

This application claims under 35 U.S.C. § 119(a) the benefit of Korean Patent Application No. 10-2020-0039900, filed on Apr. 1, 2020 in the Korean Intellectual Property Office, the entire contents of which are incorporated herein by reference.

BACKGROUND

1. Technical Field

The present disclosure relates to a method and apparatus for automatically arranging seats of an autonomous vehicle, more particularly, to the method and apparatus for automatically arranging seats in which the seats are remotely moved and arranged to desired positions without interference between the seats and peripheral components in the autonomous vehicle.

2. Description of the Related Art

An autonomous vehicle is a smart vehicle, which employs autonomous traveling technology in which the vehicle travels by itself to a destination without direct manipulation of a handle, an acceleration pedal, a brake pedal or the like by a driver. Autonomous vehicles have rapidly developed in recent years.

When autonomous traveling is universally realized, a driver may select either a manual driving mode, in which the driver directly drives a vehicle, or an autonomous traveling mode, in which the vehicle travels by itself to a destination without direct manipulation by the driver.

In an autonomous traveling mode, it is possible to realize various seating arrangement modes, such as an individual arrangement mode in which passengers sitting in seats can rest in comfortable positions and an opposite-sitting arrangement mode in which passengers sitting in first-row seats face passengers sitting in second-row seats, depending on the arrangement of the seats. In order to realize various arrangement modes of seats, the positions and postures of the seats must be remotely controlled.

If seats are not arranged in a priority sequence when the seats are remotely controlled so as to be moved to target positions, the seats may interfere with peripheral components during movement of the seats, thereby impeding smooth arrangement of the seats.

Details described as the background art are intended merely for the purpose of promoting understanding of the background of the present disclosure, and should not be construed as an acknowledgment of the prior art that is previously known to those of ordinary skill in the art.

SUMMARY

Therefore, the present disclosure provides a method and apparatus for automatically arranging seats of an autonomous vehicle in which the seats are remotely controlled so as to be moved to target positions and to be arranged in a priority sequence, thereby preventing interference with the seats during movement of the seats and thus enabling easy arrangement of the seats.

In accordance with an aspect of the present disclosure, the above and other objects can be accomplished by the provision of a method of automatically arranging seats of an autonomous vehicle by remotely controlling positions and postures of the seats, the method including steps of: generating a signal, by a manipulation device, corresponding to a target arrangement mode of the seats, determining, by seating controllers, current positions and postures of the seats and then moving the seats, by seat motors respectively provided in the seats, to change an arrangement of the seats to a standard arrangement mode upon generation of the signal corresponding to the target arrangement mode, and controlling, by the seat controllers, the positions and postures of the seats to change the arrangement of the seats to a final target arrangement mode after the arrangement of the seats is changed to the standard arrangement mode.

The method may further include determining whether the seats interfere with a peripheral component when the arrangement of the seats is changed to the standard arrangement mode by detecting current positions and postures of the seats when the determining step is carried out, wherein, when the interference is determined to occur, the seats and the peripheral component are controlled so as to be moved to a safety zone in which the interference does not occur, and the seats are moved so as to change the arrangement of the seats to the standard arrangement mode, and wherein, when the interference is determined not to occur, the seats are immediately moved so as to change the arrangement of the seats to the standard arrangement mode without controlling the seats and the peripheral component to be moved to the safety zone.

The method may further include determining whether the seats interfere with a peripheral component when the arrangement of the seats is changed to the target arrangement mode from the standard arrangement mode when the controlling step is carried out, wherein, when the interference is determined to occur, the seats and the peripheral component in the standard arrangement mode are controlled so as to be moved to a safety zone in which the interference does not occur, and the seats are moved so as to change the arrangement of the seats to the target arrangement mode, and wherein, when the interference is determined not to occur, the seats are immediately moved so as to change the arrangement of the seats to the target arrangement mode without controlling the seats and the peripheral component to be moved to the safety zone.

The controlling the seats and the peripheral component to be moved to the safety zone in which the interference does not occur when the arrangement of the seats is changed to the standard arrangement mode or the target arrangement mode may includes one or more movements from among swiveling of the seat, linear movement of the seat along a seat rail, reclining movement of a seat back and height-adjusting movement of the seat.

The peripheral components may include a console, which moves along a console rail, and, when the arrangement of the seats is changed to the standard arrangement mode or the target arrangement mode, the console may be moved to the safety zone in which interference with the seats does not occur, and the seats may be moved so as to change the arrangement of the seats to the standard arrangement mode or the target arrangement mode.

When the seats are jammed due to the interference with the peripheral component while the arrangement of the seats is changed to the standard arrangement mode or the target arrangement mode, an abnormal signal may be transmitted to the manipulation device so as to enable a passenger to visually and aurally recognize the abnormal signal.

When the vehicle is turned off after the arrangement of the seat is completely changed to the target arrangement mode, the arrangement of the seats may be automatically changed to the standard arrangement mode.

The seats may include first-row seats including a driver seat and a front passenger seat and second-row seats positioned behind the first-row seats, and, when the arrangement of the seats is changed to the standard arrangement mode or the target arrangement mode, arrangement of one row of seats among the first-row seats and the second-row seats may be first changed, and then arrangement of a remaining row of seats may be changed.

The standard arrangement mode of the seats may be configured such that all of first-row seats including a driver seat and a front passenger seat and second-row seats positioned behind the first-row seats face forwards.

In accordance with another aspect of the present disclosure, there is provided an apparatus for automatically arranging seats of autonomous vehicle including a manipulation device configured to generate a signal corresponding to a target arrangement mode of seats through manipulation by a passenger, seat motors, which are respectively provided in the seats so as to control positions and postures of the seats, seat controllers for controlling operation of the seat motors, and a vehicle controller configured to transmit a signal from the manipulation device to the seat controllers, transmit an abnormal signal indicating jamming of the seats to the manipulation device or control the seat controllers provided in the vehicle.

The manipulation device may be a display device of the vehicle, which is configured to be manipulated by a passenger in a touch manner or a mobile phone carried by the passenger.

Each of the seat motors may include a swivel motor for swiveling the seat, a sliding motor for moving the seat along a seat rail, a reclining motor for rotating a seat back, and a height motor for adjusting a height of the seat.

The seats may include first-row seats including a driver seat and a front passenger seat and second-row seats positioned behind the first-row seats, a console including a console rail and a console motor may be provided between the driver seat and the front passenger seat so as to be movable along the console rail using power from the console motor, and operation of the console motor may be controlled by the vehicle controller.

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION OF THE PREFERRED EMBODIMENTS

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Specific structural and functional descriptions of embodiments of the present disclosure disclosed herein are only for purposes of illustration of the embodiments of the present disclosure. The present disclosure may be embodied in many different forms without departing from the spirit and significant characteristics of the present disclosure. Therefore, the embodiments of the present disclosure are disclosed only for illustrative purposes, and should not be construed as limiting the present disclosure.

Reference will now be made in detail to various embodiments of the present disclosure, specific examples of which are illustrated in the accompanying drawings and described below, since the embodiments of the present disclosure can be variously modified in many different forms. While the present disclosure will be described in conjunction with exemplary embodiments thereof, it is to be understood that the present description is not intended to limit the present disclosure to those exemplary embodiments. On the contrary, the present disclosure is intended to cover not only the exemplary embodiments, but also various alternatives, modifications, equivalents and other embodiments that may be included within the spirit and scope of the present disclosure as defined by the appended claims.

It will be understood that, although the terms "first," "second," etc. may be used herein to describe various elements, these elements should not be limited by these terms. These terms are only used to distinguish one element from another element. For instance, a first element discussed below could be termed a second element without departing from the teachings of the present disclosure. Similarly, the second element could also be termed the first element.

It will be understood that when an element is referred to as being "coupled" or "connected" to another element, it can be directly coupled or connected to the other element, or intervening elements may be present therebetween. In contrast, it should be understood that when an element is referred to as being "directly coupled" or "directly connected" to another element, there are no intervening elements present. Other expressions that explain the relationship between elements, such as "between," "directly between," "adjacent to," or "directly adjacent to," should be understood in the same way.

Unless otherwise defined, all terms including technical and scientific terms used herein have the same meanings as those commonly understood by one of ordinary skill in the art to which this disclosure belongs. It will be further understood that terms, such as those defined in commonly used dictionaries, should be interpreted as having meanings consistent with their meanings in the context of the relevant art and the present disclosure, and are not to be interpreted in an idealized or overly formal sense unless expressly so defined herein.

The control unit (controller) according to an exemplary embodiment of the present disclosure may be embodied by a non-volatile memory (not shown) configured to store an algorithm configured to control the operation of various components of a vehicle or data relating to software instructions for regenerating the algorithm and a processor (not shown) configured to perform operations, which will be described below, using the data stored in the memory. Here, the memory and the processor may be embodied by a separate chip. Alternatively, the memory and the processor may be embodied by a single chip in which the memory and the processor are integrated with each other. The processor may include one or more processors.

Hereinafter, a method and apparatus for automatically arranging seats of an autonomous vehicle according to a preferred embodiment of the present disclosure will be described with reference to the accompanying drawings.

Figure 1:
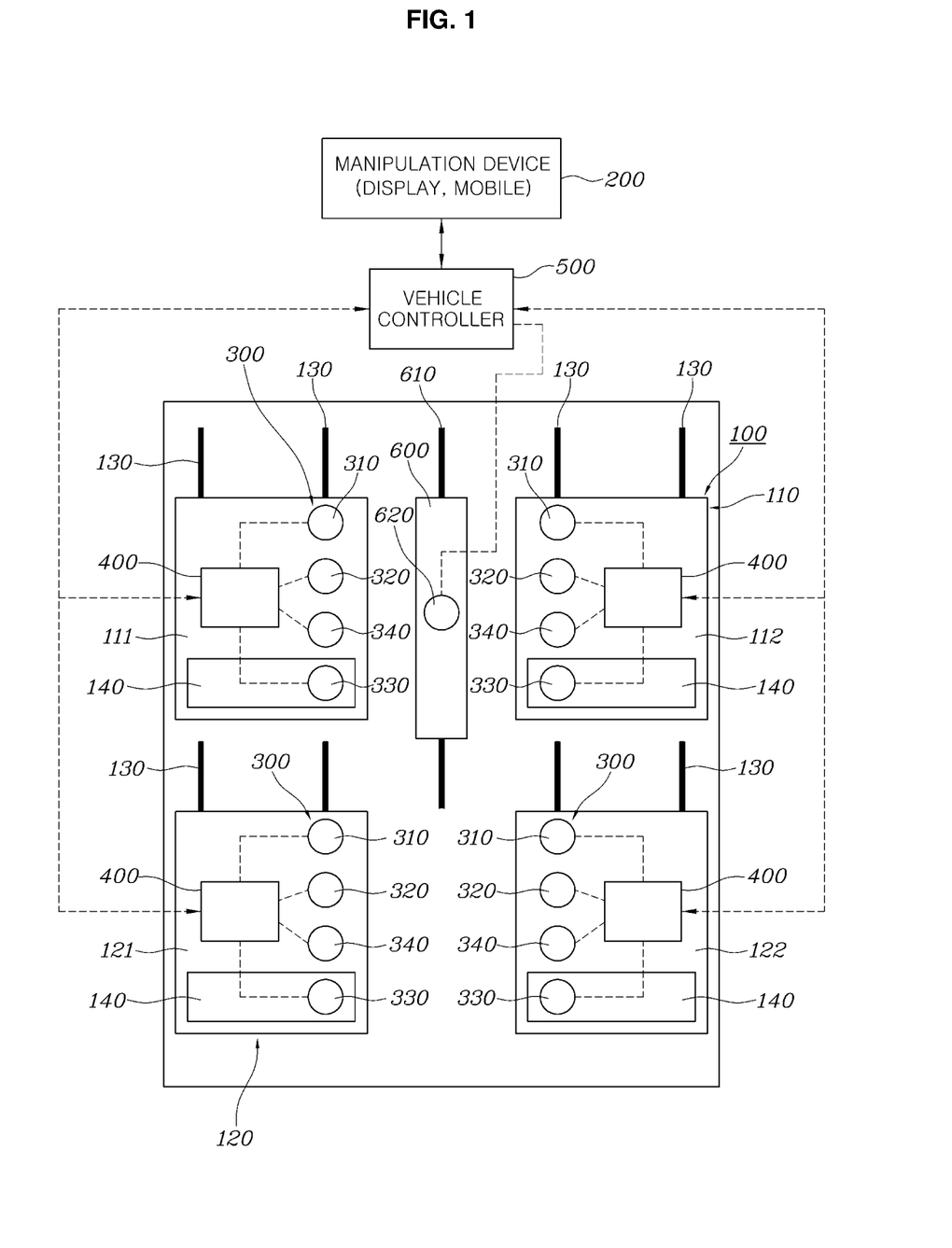
FIG. 1 is a schematic view illustrating an apparatus for automatically arranging seats of an autonomous vehicle according to the present disclosure.

As illustrated in FIG. 1, the apparatus for automatically arranging seats of an autonomous vehicle according to the embodiment of the present disclosure includes a manipulation device 200 for generating a signal corresponding to a desired arrangement of seats 100 through manipulation by a passenger, seat motors 300, which are respectively provided at the seats 100 so as to control positions and postures of the seats 100, seat controllers 400 configured to control the operation of the seat motors 300, respectively, and a vehicle controller 500 configured to transmit a signal from the manipulation device 200 to the seat controllers 400 and to transmit an abnormal signal, attributable to jamming of the seats 100 to the manipulation device 200 or to control the seat controllers 400 provided in the vehicle.

The seats 100, which are provided in the autonomous vehicle, includes first-row seats 110, including a driver seat 111 and a front passenger seat 112, and second-row seats 120 positioned behind the first-row seats 110.

The seats 100 may further include third row seats depending on the type of vehicle.

The first-row seats 110 and the second-row seats 120 are configured to be individually operated by the activation of the seat motors 300 through control of the seat controllers 400.

The movement of the seats 100 includes swiveling of the seats 100, linear movement of the seats 100 along seat rails 130, reclining movement of the seat backs 140, and height-adjusting movement of the seats 100.

The manipulation device 200 may be a display (AVN) of the vehicle, which is manipulated by a passenger in a touch manner, or a mobile phone carried by the passenger.

The seats 100 are respectively provided with the seat motors 300. Each of the seat motors 300 includes a swivel motor 310 for rotating the seat 100, a sliding motor 320 for moving the seat 100 along the seat rails 130, a reclining motor 330 for rotating the seat back 140, and a height motor 340 for controlling the height of the seat 100.

The swivel motor 310, the sliding motor 320, the reclining motor 330 and the height motor 340 are configured to be independently operated under the control of the seat controller 400 for a corresponding one of the seats 100.

A console rail 610 is provided between the driver seat 111 and the front passenger seat 112. A console 600 including a console motor 620 is mounted on the console rail 610. The console is configured to be movable along the console rail 610 using the power from the console motor 620. The console motor 620 is configured to be controllably operated by the vehicle controller 500.

Peripheral components may include the console 600, a dashboard or the like.

Each of the seats 100 may be configured to be movable in anteroposterior and lateral directions, and may be configured to be movable in a diagonal direction if necessary.

The seat rails 130 may be configured to enable the seat 100 to be moved. When autonomous traveling is universally realized, it will be possible to enable the seat 100 to be moved to a desired position even without the seat rails 130.

Further, the console 600 may also be configured to be moved in a manner similar to the seat 100.

Figure 2:
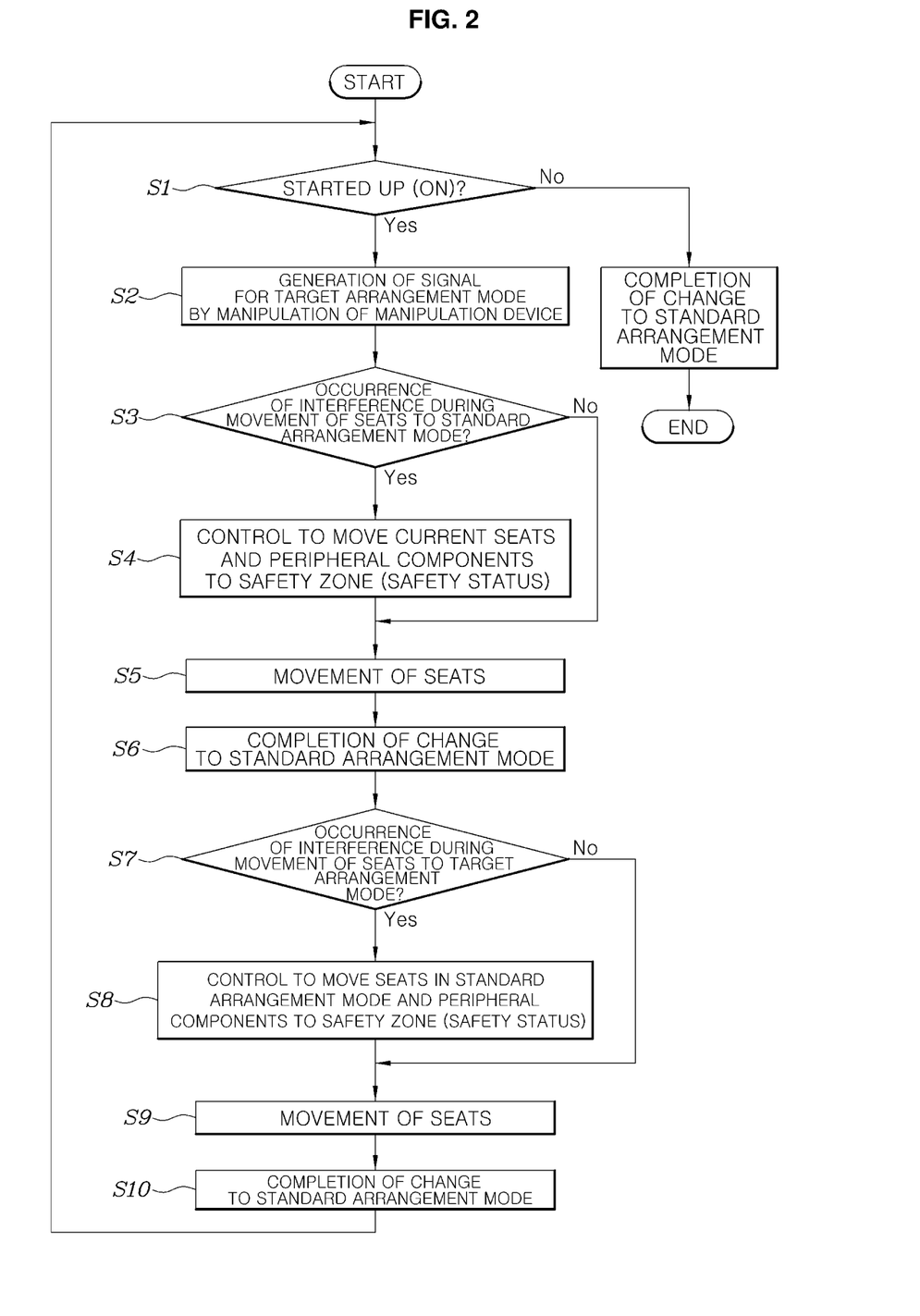
FIG. 2 is a schematic flowchart illustrating a method of automatically arranging seats of an autonomous vehicle according to the present disclosure.

Next, the method of automatically arranging the seats of an autonomous vehicle according to the embodiment of the present disclosure will be described with reference to FIGS. 1 and 2.

When the vehicle is started up (Operation S1), a signal corresponding to a target arrangement mode of the seats 100 is generated through manipulation of the manipulation device 200 by a passenger (Operation S2), and the seats 100 of the vehicle are changed to a standard arrangement mode from the current arrangement and are then finally changed to the target arrangement mode desired by the passenger.

Here, the standard arrangement mode of the seats 100 may be defined as a mode in which all of the first-row seats 110, including the driver seat 111 and the front passenger seat 112, and the second-row seats 120 positioned behind the first-row seats 110 face forwards.

When the signal corresponding to the target arrangement mode is generated in Operation S2, the vehicle controller 500 determines whether the seats 100 interfere with peripheral components while the seats 100, which are positioned in a current certain mode, are changed to the standard arrangement mode, which is the first target mode (Operation S3).

Specifically, the seat controller 400 detects the current positions and postures of the seats 100 using the hall sensors of the swivel motor 310, the sliding motor 320, the reclining motor 330 and the height motor 340, which constitute the seat motor 300, and transmits the detected positions and postures to the vehicle controller 500. The vehicle controller 500 determines whether the seats 100 interfere with the peripheral components while the seats 100 are changed to the standard arrangement mode, which is the first target mode, with reference to the information about the seats 100, which is transmitted from the seat controller 400, and to the path along which the seats 100 are moved.

Furthermore, the vehicle controller 500 also determines whether the seats 100 interfere with the console at the current position while the seats 100 are changed to the standard arrangement mode by receiving the information about the position of the console 600, which is one of the peripheral components of the seats 100, from the hall sensor provided in the console motor 620.

When it is determined that interference occurs as a result of the determination in Operation S3, the seats 100 and the peripheral component (the console) are controlled to be in a safety status (positioned in a safety zone) in which the seats 100 do not interfere with peripheral components (Operation S4), and then the seats 100 are moved (Operation S5), thereby completing the change to the standard arrangement mode (S6).

In other words, when interference therebetween is determined to occur as a result of the detection in Operation S3, the signal from the vehicle controller 500 is transmitted to the seat controller 400. Accordingly, only desired ones of the swivel motor 310, the sliding motor 320, the reclining motor 330 and the height motor 340, which are provided in the seat 100, is selectively operated through control of the seat controller 400, and the seats 100 thus perform one or more movements from among swiveling, linear movement along the seat rails 130, reclining movement of the seat back 140 and height-adjusting movement, thereby controlling the seat 100 to be positioned in the safety status (safety zone) in which interference between the seats 100 and the peripheral components does not occur.

Furthermore, the console motor 620 is activated through control of the vehicle controller 500 so as to move the console 600 to the safety zone in which interference between the console 600 and the seats 100 does not occur, thereby preventing the interference between the seats 100 and the console 600 while the seats are changed to the standard arrangement mode.

When interference therebetween is determined not to occur as a result in Operation S3, the seats 100 are directly moved (Operation S5) without an operation of controlling the seats 100 to change to the safety status through the control of the vehicle controller 500 and the seat controller 400, thereby completing the change to the standard arrangement mode (Operation S6).

After the change to the standard arrangement mode is completed as in Operation S6, the change of the seats 100 to the target arrangement mode, which is the final target mode, is then performed.

The vehicle controller 500 also determines whether interference between the seats 100 and the peripheral components occurs while the seats 100 are changed to the target arrangement mode from the standard arrangement mode (Operation S7). When it is determined that interference occurs as a result of the determination, the seat 100 in the standard arrangement mode and the peripheral component (console) are controlled to be moved to the safety status (safety zone) (Operation S8), and the seats 100 are moved (Operation S9), thereby completing the change to the target arrangement mode (Operation S10). When it is determined that interference does not occur as a result of the determination, the seats 100 of the vehicle are directly moved (Operation S9) without the change to the safety status from the standard arrangement mode through control of the vehicle controller 500 and the seat controller 400, thereby completing the change to the target arrangement mode (Operation S10).

Since the determination as to whether interference occurs during the change to the target arrangement mode in Operation S7 is the same as the determination as to whether interference occurs in Operation S3 and the control to move the seats to the safety status (safety zone) during the change to the target arrangement mode in Operation S8 is the same as in Operation S4, a description thereof is omitted.

According to the embodiment of the present disclosure, when the seats 100 are jammed due to interference with peripheral components (the console, the dashboard or the like) while the seats 100 are being changed to the standard arrangement mode or the target arrangement mode, an abnormal signal is transmitted to the manipulation device 200 through control of the seat controllers 400 and the vehicle controller 500 so as to enable a passenger to recognize the abnormal signal through his/her visual and auditory senses.

In other words, when any one of the seats 100 is jammed while the seats 100 are moved, a load is applied to the corresponding seat motor 300. At this time, an abnormal signal of the motor is transmitted to the manipulation device 200, which is manipulated by the passenger, so as to enable the passenger to visually or aurally recognize the abnormal signal transmitted to the manipulation device 200. Accordingly, the passenger is capable of preventing damage and breakage of the components by abruptly stopping movement of the seats 100.

Furthermore, according to the embodiment of the present disclosure, when the seats 100 are changed to the standard arrangement mode or the target arrangement mode, one row of seats among the first-row seats 110 and the second-row seats 120 is first changed, and then the other row of seats is changed. Accordingly, in the normal case, the first-row seats 110 are changed first, and then the second-row seats 120 are subsequently changed.

FIGS. 3A-3F illustrate an exemplary procedure in which the current seats 100, which are arbitrarily arranged, are changed to the standard arrangement mode.

Figure 3A:
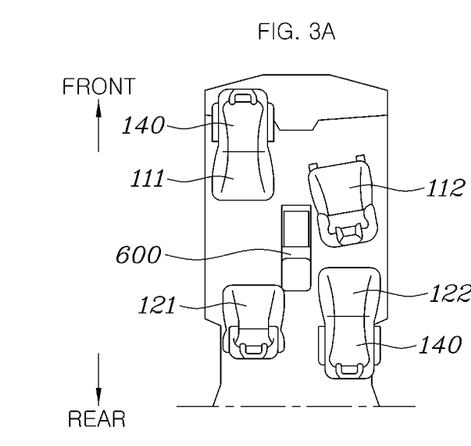
FIGS. 3A-3F are views illustrating an exemplary procedure in which current seats, which are arbitrarily arranged, are changed to a standard arrangement mode.

In FIG. 3A, the drive seat 111 is in the relaxation state, in which the driver seat 111 faces rearwards and the seat back 140 thereof is swiveled forwards and is thus inclined, and the front passenger seat 112 of the first-row seats 110 faces forwards and is swiveled counterclockwise at a predetermined angle. Here, the left seat of the second-row seats 120 is in the standard position in which the seat faces forwards, and the right seat 122 of the second-row seats 120 is in a relaxation state, in which the seat 122 faces forwards and the seat back 140 thereof is swiveled and inclined rearwards.

Figure 3B:
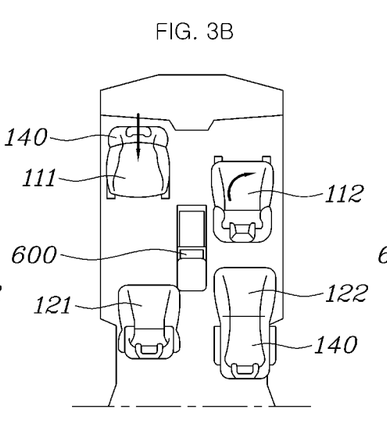

When the passenger manipulates the manipulation device 200 in FIG. 3A, the seats 100 are moved so as to be changed to the standard arrangement mode. Here, the seat back 140 of the driver seat 111 of the first-row seats 110 is first erected while the driver seat 111 faces rearwards, and the front passenger seat 112 of the first-row seats 110 is swiveled clockwise at a predetermined angle so as to face forwards, thereby assuming the standard position, as illustrated in FIG. 3B.

Figure 3C:
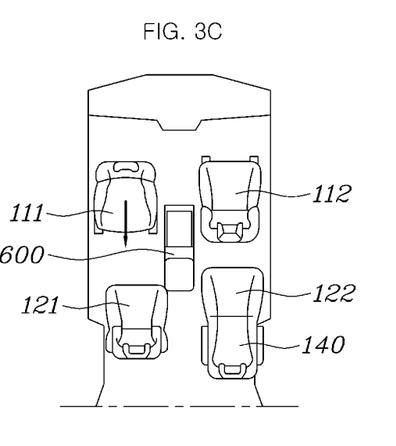
Figure 3D:
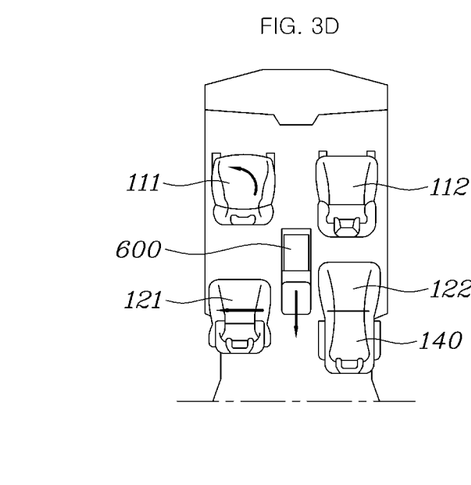

Subsequently, the driver seat 111 of the first-row seats 110 is moved rearwards, as illustrated in FIG. 3C, and the left seat 121 of the second-row seats 120 is moved leftwards so as to ensure a space, as illustrated in FIG. 3D. The console 600 is moved rearwards so as to ensure a space (the console 600 is moved to the safety zone in which the console does not interfere with the seat), and the driver seat 111 of the first-row seats 110 is swiveled so as to face forwards, thereby assuming the standard position.

Figure 3E:
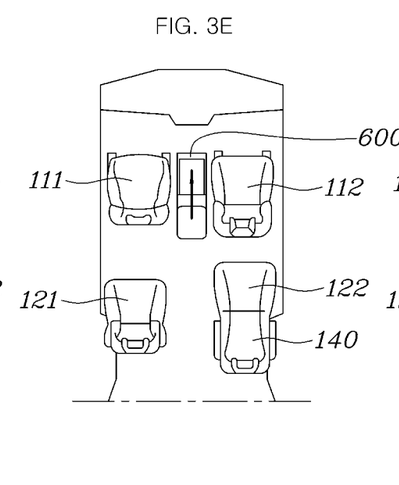
Figure 3F:
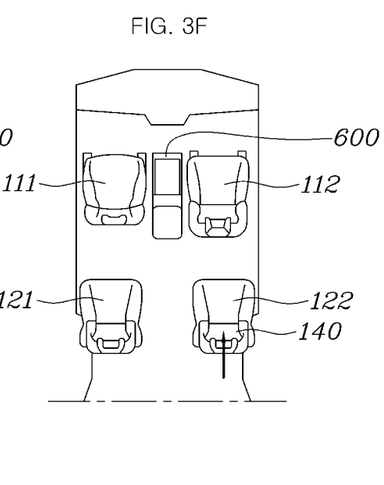

After the driver seat 111 of the first-row seats 110 assumes the standard position, the console 600 is moved forwards, as illustrated in FIG. 3E. The seat back 140 of the right seat 122 of the second-row seats 120 is erected, and the first-row seats 110 and the second-row seats are arranged, with the result that the current seats 100, which are arbitrarily arranged, are completely changed to the standard arrangement mode, as illustrated in FIG. 3F.

Figure 4A:
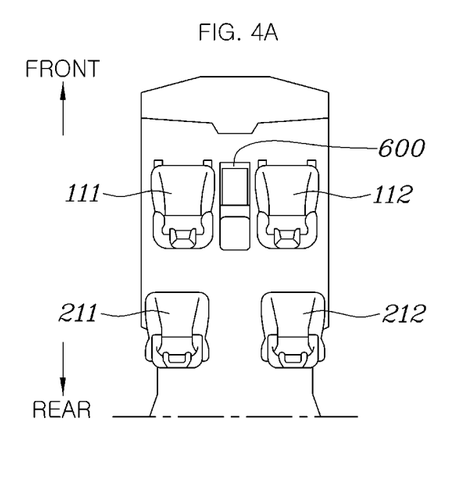
FIGS. 4A-4D are views illustrating an exemplary procedure in which the seats are changed to a target arrangement mode from the standard arrangement mode.

FIGS. 4A-4D illustrate an exemplary procedure in which the seats 100 are changed to a target arrangement mode from the standard arrangement mode (an opposite-sitting mode in which the first-row seats face the second-row seats). FIG. 4A illustrates the standard arrangement mode in which all of the driver seat 111 and the front passenger seat 112 of the first-row seats 110 and the left seat 121 and the right seat 122 of the second-row seats 120 face forwards.

Figure 4B:
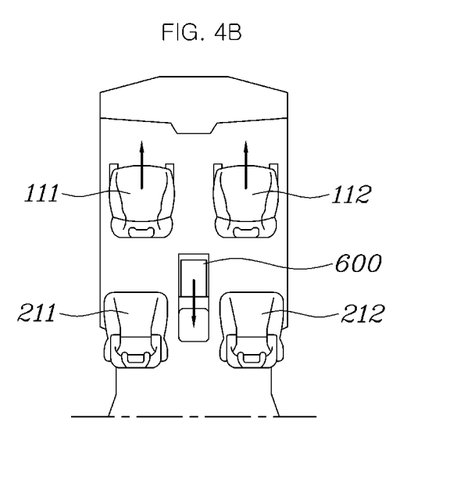

From the state in FIG. 4A, the driver seat 111 and the front passenger seat 112 of the first-row seats 110 are moved forwards, and the console 600 is moved rearwards so as to ensure space required for swiveling the driver seat 111 and the front passenger seat 112, as illustrated in FIG. 4B.

Figure 4C:
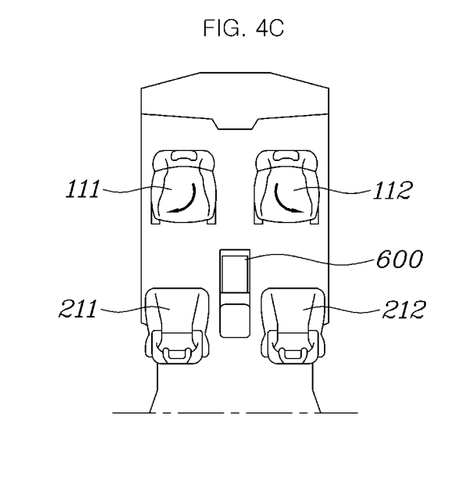
Figure 4D:
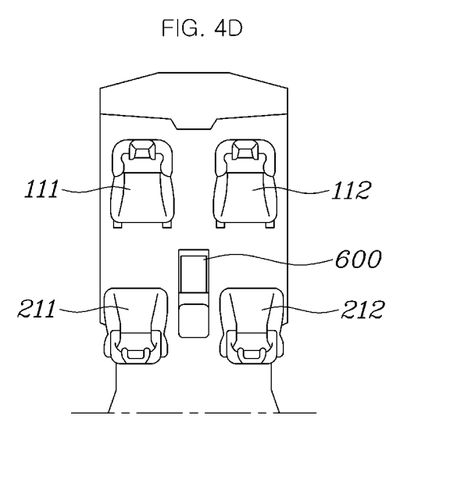

After the space is ensured, the driver seat 111 and the front passenger seat 112 of the first-row seats 110 are swiveled so as to face rearwards, thereby assuming the opposite-sitting position, as illustrated in FIG. 4C. Subsequently, the first-row seats 110 and the second-row seats 120 are completely arranged, thereby completing the change to the opposite-sitting mode, which is the target arrangement mode, as illustrated in FIG. 4D.

As is apparent from the above description, the method and apparatus for automatically arranging seats of an autonomous vehicle are advantageous in that the seats 100 are remotely controlled so as to be moved to target positions and to be arranged in priority sequence, thereby preventing interference with the seats 100 during movement of the seats and thus easily arranging the seats.

Particularly, since the arrangement of the seats 100 in an autonomous vehicle is changed in such a manner as to first change the seats 100 to the standard arrangement mode and then to the final target arrangement mode, it is possible to prevent interference with peripheral components during movement of the seats 100, and thus it is possible to easily change the seats 100 to a desired arrangement mode in an autonomous vehicle.

Although the preferred embodiments of the present disclosure have been described above with reference to the accompanying drawings, those skilled in the art will appreciate that the present disclosure can be implemented in various other embodiments without changing the technical ideas or features thereof.

What is claimed is:

1. A method of automatically arranging seats of an autonomous vehicle by remotely controlling positions and postures of the seats, the method comprising the steps of:

generating, by a manipulation device, a signal corresponding to a target arrangement mode of the seats;

determining, by seat controllers, current positions and postures of the seats and then moving the seats, by seat motors respectively provided in the seats, to change an arrangement of the seats to a standard arrangement mode upon generation of the signal corresponding to the target arrangement mode;

controlling, by the seat controllers, the positions and postures of the seats to change the arrangement of the seats to the target arrangement mode after the arrangement of the seats is changed to the standard arrangement mode; and determining whether the seats interface with a peripheral component when the arrangement of the seats is changed to the standard arrangement mode by detecting current positions and postures of the seats when the determining step is carried out;

wherein when the interferences is determined to occur, the seats and the peripheral component are controlled so as to be moved to a safety zone in which the interference does not occur, and the seats are moved so as to changed the arrangement of the seats to the standard arrangement mode;

wherein the standard arrangement mode of the seats is configured such that all of first-row seats including a driver seat and a front passenger seat and second-row seats positioned behind the first-row seats face forward while the first-row seats and the second-row seats are aligned in a front and rear direction of the vehicle; and wherein controlling the seats and the peripheral component to be moved to the safety zone in which the interference does not occur when the arrangement of the seats is changed to the standard arrangement mode includes swiveling of the seat, linear movement of the seat along a seat rail, reclining movement of a seat back, and height-adjusting movement of the seat.

2. The method according to claim 1, wherein, when the interference is determined not to occur, the seats are immediately moved so as to change the arrangement of the seats to the standard arrangement mode without controlling the seats and the peripheral component to be moved to the safety zone.

3. The method according to claim 2, further comprising determining whether the seats interfere with a peripheral component when the arrangement of the seats is changed to the target arrangement mode from the standard arrangement mode when the controlling step is carried out, wherein, when the interference is determined to occur, the seats and the peripheral component in the standard arrangement mode are controlled so as to be moved to a safety zone in which the interference does not occur, and the seats are moved so as to change the arrangement of the seats to the target arrangement mode, and wherein, when the interference is determined not to occur, the seats are immediately moved so as to change the arrangement of the seats to the target arrangement mode without controlling the seats and the peripheral component to be moved to the safety zone.

4. The method according to claim 2, wherein the peripheral components include a console, which moves along a console rail, and wherein, when the arrangement of the seats is changed to the standard arrangement mode or the target arrangement mode, the console is moved to the safety zone in which interference with the seats does not occur, and the seats are moved so as to change the arrangement of the seats to the standard arrangement mode or the target arrangement mode.

5. The method according to claim 1, wherein, when the seats are jammed due to the interference with the peripheral component while the arrangement of the seats is changed to the standard arrangement mode or the target arrangement mode, an abnormal signal is transmitted to the manipulation device so as to enable a passenger to visually and aurally recognize the abnormal signal.

6. The method according to claim 1, wherein, when the arrangement of the seats is changed to the standard arrangement mode or the target arrangement mode, arrangement of one row of seats among the first-row seats and the second-row seats is first changed, and then arrangement of a remaining row of seats is changed.

7. The method according to claim 1, wherein, when the vehicle is turned off after the arrangement of the seat is completely changed to the target arrangement mode, the arrangement of the seats is automatically changed to the standard arrangement mode.

8. An apparatus for automatically arranging seats of an autonomous vehicle by remotely controlling positions and postures of the seats, the apparatus comprising:
- a manipulation device configured to generate a signal corresponding to a target arrangement mode of seats through manipulation by a passenger;
- seat motors, which are respectively provided in the seats so as to control positions and postures of the seats, wherein each of the seat motors includes a swivel motor for swiveling the seat, a sliding motor for moving the seat along a seat rail, a reclining motor for rotating a seat back, and a height motor for adjusting a height of the seat;
- seat controllers for controlling operation of the seat motors; and
- a vehicle controller configured to transmit a signal from the manipulation device to the seat controllers, transmit an abnormal signal indicating jamming of the seats to the manipulation device or control the seat controllers provided in the vehicle;
- wherein a standard arrangement mode of the seats is configured such that all of first-row seats including a driver seat and a front passenger seat and second-row seats positioned behind the first-row seats face forward while the first-row seats and the second-row seats are aligned in a front and rear direction of the vehicle; and
- determining whether the seats interfere with a peripheral component when the arrangement of the seats is changed to the standard arrangement mode by detecting current positions and postures of the seats when the determining step is carried out;
- wherein, when the interference is determined to occur, the seats and the peripheral component are control sing the seat motors so as to be moved to a safety zone in which the interference does not occur, id the seats are moved so as to change the arrangement of the seats to the standard arrangement mode, and
- wherein controlling the seats and the peripheral component to be moved to the safety zone in which the interference does not occur when the arrangement of the seats is changed to the standard arrangement mode includes swiveling of the seat, linear movement of the seat along a seat rail reclining movement of a seat back, and height-adjusting movement of the seat.

9. The apparatus according to claim 8, wherein the manipulation device is a display device of the vehicle, which is configured to be manipulated by a passenger in a touch manner or a mobile phone carried by the passenger.

10. The apparatus according to claim 8, wherein a console including a console rail and a console motor is provided between the driver seat and the front passenger seat so as to be movable along the console rail using power from the console motor, and operation of the console motor is controlled by the vehicle controller.

* * * * *